(12) United States Patent
Andrews et al.

(10) Patent No.: US 9,244,774 B2
(45) Date of Patent: Jan. 26, 2016

(54) STORAGE DEVICE FAILURE RECOVERY SYSTEM

(71) Applicant: Dell Products L.P., Round Rock, TX (US)

(72) Inventors: Carlton A. Andrews, Austin, TX (US); Gary D. Huber, Austin, TX (US); Yuan-Chang Lo, Austin, TX (US); Todd Swierk, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 145 days.

(21) Appl. No.: 14/081,786

(22) Filed: Nov. 15, 2013

(65) Prior Publication Data

US 2015/0143170 A1    May 21, 2015

(51) Int. Cl.
*G06F 11/00* (2006.01)
*G06F 11/14* (2006.01)

(52) U.S. Cl.
CPC ........ *G06F 11/1435* (2013.01); *G06F 11/1446* (2013.01); *G06F 11/1464* (2013.01); *G06F 11/1469* (2013.01)

(58) Field of Classification Search
CPC ............ G06F 11/1469; G06F 11/1464; G06F 11/1446; G06F 3/067
See application file for complete search history.

(56) References Cited

U.S. PATENT DOCUMENTS

| | | | |
|---|---|---|---|
| 7,721,138 B1* | 5/2010 | Lyadvinsky et al. | 714/4.1 |
| 2004/0230817 A1* | 11/2004 | Ma | 713/193 |
| 2006/0047998 A1* | 3/2006 | Darcy | 714/6 |
| 2009/0249119 A1* | 10/2009 | Sethumadhavan et al. | 714/15 |
| 2013/0024726 A1* | 1/2013 | Andrews et al. | 714/15 |

* cited by examiner

*Primary Examiner* — Charles Ehne
(74) *Attorney, Agent, or Firm* — Haynes and Boone, LLP

(57) ABSTRACT

A storage device failure recovery system includes a storage IHS and a user IHS coupled together over a network. The user IHS includes a storage system having a storage device, and a storage repair function that periodically provides a storage device image over the network to the storage IHS using data from the storage device. The storage repair function detects a failure of the storage device and streams an operating system on the user IHS using the storage device image stored on the storage IHS. While streaming the operating system on the user IHS using the storage device image stored on the storage IHS, the storage repair function analyzes the failure of the storage device, determines a storage system failure recovery procedure, and performs the storage system failure recovery procedure to restore the storage system while a user remains productive on the user IHS via the streamed operating system.

20 Claims, 10 Drawing Sheets

STORAGE DEVICE FAILURE RECOVERY SYSTEM

BACKGROUND

The present disclosure relates generally to information handling systems, and more particularly to a failure recovery system for storage devices in information handling systems.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

One of the largest support issues that IHS providers such as, for example, Dell, Inc. of Round Rock, Tex., deal with relates to storage device and operating system failures in user IHSs. For example, hard drives in user IHSs may fail due to hardware issues, and operating systems in user IHSs may fail due to software and/or malware corruption issues of the data and/or software on the hard drive. Such failures in user IHSs lead to support requests from users that may result in hard drive replacements or operating system reinstalls, each of which results in downtime (i.e., the inability to use) the user IHS, resulting in a poor user experience and a loss of user productivity.

Accordingly, it would be desirable to provide an improved storage device failure recovery system.

SUMMARY

According to one embodiment, a storage device failure recovery system includes a network; a storage IHS that is coupled to the network; and a user IHS that is coupled to the network and that includes a storage system having a storage device, wherein the user IHS includes a storage repair function that is configured to: provide a storage device image over the network to the storage IHS using data from the storage device; detect a failure of the storage device; provide an operating system on the user IHS using the storage device image stored on the storage IHS; analyze the failure of the storage device and determine a storage system failure recovery procedure while providing the operating system on the user IHS using the storage device image stored on the storage IHS; and perform at least a portion of the storage system failure recovery procedure while providing the operating system on the user IHS using the storage device image stored on the storage IHS, wherein the failure recovery procedure includes restoring the storage system using the storage device image stored on the storage IHS.

DETAILED DESCRIPTION

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a tablet computer, a consumer electronic device, a display device or monitor, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
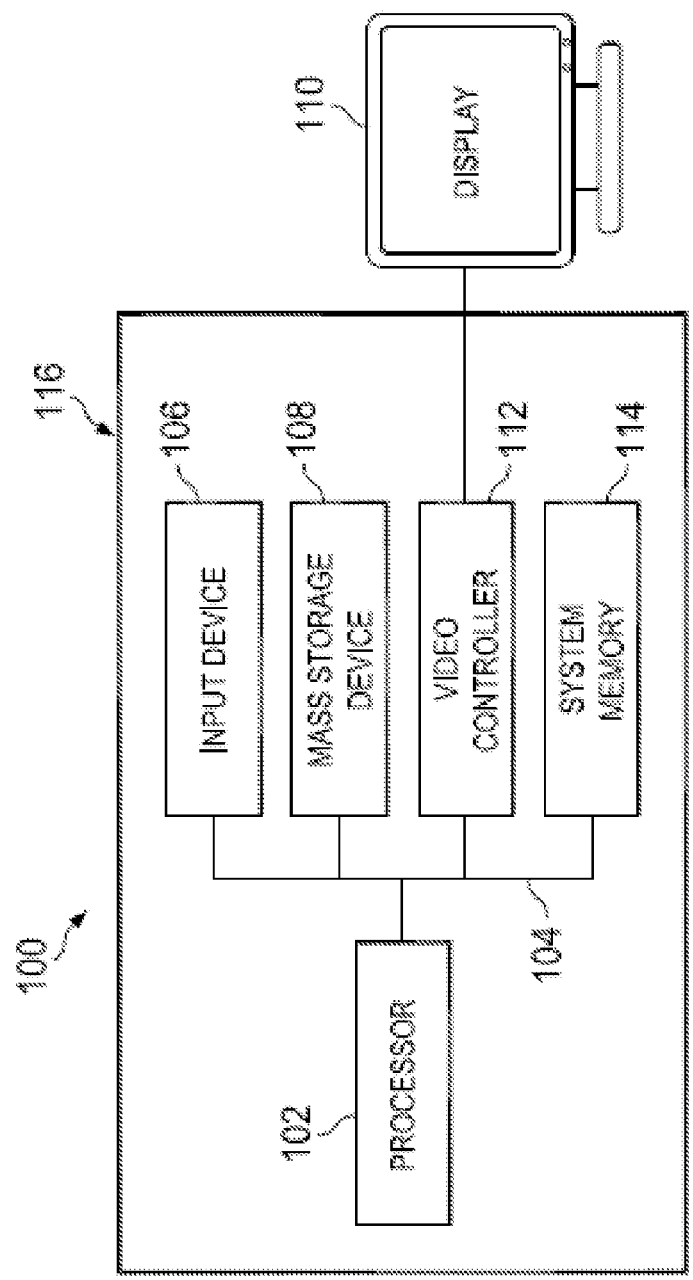
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
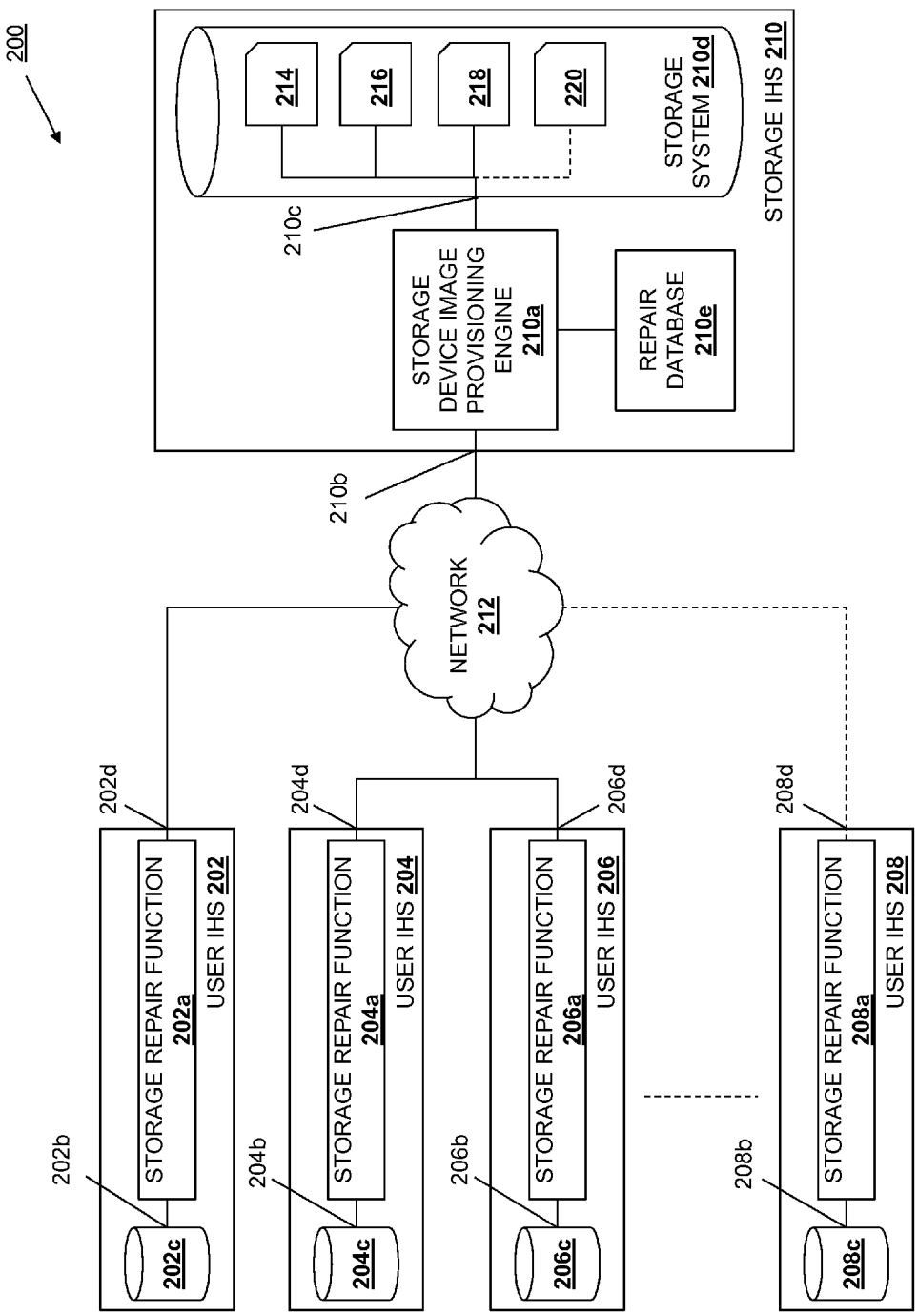
FIG. 2 is a schematic view illustrating an embodiment of a storage device failure recovery system.

Referring now to FIG. 2, an embodiment of a storage device failure recovery system 200 is illustrated that includes a plurality of users information handling systems (IHSs) 202, 204, 206, and up to 208 coupled to a storage IHS 210 through a network 212. In some embodiments, the storage device failure recovery system 200 is a "private" or local system in which a plurality of local user IHSs 202-208 are connected over a local area network (LAN) 212 to a local storage IHS 210 provided, for example, in an office location that provides the storage device failure recovery system 200. In other embodiments, the storage device failure recovery system 200 is a "public" or global system in which a plurality of dispersed user IHSs 202-208 are connected over an Internet network 212 to a storage IHS 210 such as, for example, when the storage device failure recovery system 200 is provided by a system provider that may control the storage IHS 210 and allow the user IHSs 202-208 to subscribe to storage device failure recovery services provided over the network 212. While a few specific examples of the storage device failure recovery system 200 have been provided, one of skill in the art in possession of the present disclosure will recognize how combinations of those examples, as well as a variety of other user IHS storage device scenarios, will benefit from the teachings of the present disclosure and thus will fall within its scope.

In an embodiment, each of the user IHSs 202-208 may be the user IHS 100 discussed above with reference to FIG. 1, and/or may include some or all of the components of the user IHS 100. Each of the IHSs 202-208 includes at least one processor (e.g., the processor 102 of in FIG. 1) and at least one non-transitory memory system (e.g., the storage device 108 and/or the system memory 114 of FIG. 1) that includes instructions that, when executed by the at least one processor, cause the at least one processor to provide a storage repair function 202a, 204a, 206a, and 208a, respectively, that is configured to perform the functions of the storage repair functions discussed below. The storage repair function 202a in the user IHS 202 is coupled through a storage system coupling 202b to a storage system 202c that includes at least one storage device (e.g., through one or more connections that couple the processor that provides the storage repair function 202a to the storage device in the storage system 202c). Similarly, the storage repair function 204a in the user IHS 204 is coupled through a storage system coupling 204b to a storage system 204c that includes at least one storage device, the storage repair function 206a in the user IHS 206 is coupled through a storage system coupling 206b to a storage system 206c that includes at least one storage device, and the storage repair function 208a in the user IHS 208 is coupled through a storage system coupling 208b to a storage system 208c that includes at least one storage device.

As discussed above, the storage repair functions 202a, 204a, 206a, and 208a may be provided, at least in part, by instructions on more than one non-transitory memory system. As discussed in further detail below, in some embodiment, the storage repair functions 202a-208a may be provided by the processors on the respective user IHSs 202-208 executing instructions on respective storages device in the storage systems 202c-208c of the user IHSs 202-208, instructions on the non-transitory memory systems (e.g., the system memory 114) in the user IHSs 202-208, and/or instructions retrieved over a network (e.g., from the storage IHS 210). For example, portions of the functionality of the storage repair functions 202a-208a described below with regard to the method 300 may be provided by an operating system or other application stored on the storage device in the storage systems 202c-208c of the user IHSs 202-208 (e.g., the storage device image provisioning that occurs before the storage device in the user IHS has failed), by a Basic Input Output System (BIOS) or Universally Extensible Firmware Interface (UEFI) stored on a persistent, non-transitory memory of the user IHS 202 (e.g., the storage device failure detection that detects the failure of the storage device in the user IHS), by an alternate service environment stored on a persistent, non-transitory memory of the user IHS 202 (e.g., the storage device image retrieval that occurs following the failure of the storage device in the user IHS), and by an operating system or other application stored in a storage device image that is retrieved over the network 212 (e.g., the user IHS operation that occurs during repair of the failed storage device in the user IHS, the repair of a failed storage device, the preparation of a new storage device, etc.). However, one of skill in the art in possession of the present disclosure will recognize that the storage repair functions discussed below may be provided by different subsystems and/or in a variety of different manners while remaining within the scope of the present disclosure.

In an embodiment, the at least one storage device in the storage systems 202c, 204c, 206c, and 208c may store instructions and/or data that, when executed by the at least one processor in its respective user IHSs 202-208, cause the at least one processor to provide an operating system (e.g., the Windows® operating system available from Microsoft Corporation of Redmond, Wash.) that allows a user to operate that user IHS. In addition, the at least one storage device in the storage systems 202c, 204c, 206c, and 208c may store instructions, files, settings, and/or other data that allow its respective user IHS 202-208 to operate as desired by a user.

The storage repair function 202a in the user IHS 202 is also coupled through a communications coupling 202d to the network 212 (e.g., through one or more connections that couple the at least one processor that provides the storage repair function 202a to the communications coupling 202d that may include a Network Interface Controller (NIC)). Similarly, the storage repair function 204a in the user IHS 204 is coupled through a communications coupling 204d to the network 212, the storage repair function 206a in the user IHS 206 is coupled through a communications coupling 206d to the network 212, and the storage repair function 208a in the user IHS 208 is coupled through a communications coupling 208d to the network 212.

The storage IHS 210 may be the user IHS 100 discussed above with reference to FIG. 1, and/or may include some or all of the components of the user IHS 100. The storage IHS 210 includes at least one processor (e.g., the processor 102 of in FIG. 1) and at least one non-transitory memory system (e.g., the storage device 108 and/or the system memory 114 of FIG. 1) that includes instructions that, when executed by the processor, cause the processor to provide a storage device image provisioning engine 210a that is configured to perform the functions of the storage device image provisioning engines discussed below. The storage device image provisioning engine 210a in the storage IHS 210 is coupled through a communications coupling 210b to the network 212 (e.g., through one or more connections that couple the at least one processor that provides the storage device image provisioning engine 210a to the communications coupling 202d that may include a Network Interface Controller (NIC)). The storage device image provisioning engine 210a in the storage IHS 210 is also coupled through a storage system coupling 210c to a storage system 210d that includes at least one storage device (e.g., through one or more connections that couple the at least one processor that provides the storage device image provisioning engine 210a to the storage device in the storage system 210d) that stores storage device images 214, 216, 218, and 220 according to the operation of the method 300, discussed in detail below. The storage device image provisioning engine 210a in the storage IHS 210 may also be coupled to a repair database 210e that may be used, for example, to provide repair software for analyzing and repairing a failed storage device, discussed below.

In the illustrated embodiment, the storage device images 214 include one or more storage device images provided in the storage system 210d of the storage IHS 210 with data received from the at least one storage device in the storage system 202c of the user IHS 202a. Similarly, the storage device images 216 include one or more storage device images provided in the storage system 210d of the storage IHS 210 with data received from the at least one storage device in the storage system 204c of the user IHS 204a, the storage device images 218 include one or more storage device images provided in the storage system 210d of the storage IHS 210 with data received from the at least one storage device in the storage system 206c of the user IHS 206a, and the storage device images 220 include one or more storage device images provided in the storage system 210d of the storage IHS 210 with data received from the at least one storage device in the storage system 208c of the user IHS 208a.

As discussed above, while a specific embodiment of a storage device failure recovery system 200 has been illustrated and described that includes a plurality of user IHSs connected to the storage IHS over a network, a wide variety of modification to that embodiment is envisioned as falling within the scope of the present disclosure. In the embodiment discussed below with reference to the method 300, a single user IHS (the user IHS 202) is discussed as communicating with the storage IHS 210 to provide for the recovery from a storage device failure. One of skill in the art in possession of the present disclosure will recognize that any of the other user IHSs 204-208 may communicate with the storage IHS 210, concurrently and/or at different times, to provide for the recovery from a storage device failure. Furthermore, in some embodiments, the discussion of the storage device failure recovery system 200 with regard to the method 300 may apply to single user IHS/storage IHS system (e.g., as utilized by a user to back up their home computer and recover from storage device failures on that home computer.) As such, in some embodiments, the storage IHS 210 and/or some or all of its components may include a non-primary storage device (e.g., relative to the primary storage device in the storage system 202c of the user IHS 202) that is directly connected to the user IHS 202 rather than over the network 212, or connected to that user IHS over a home network.

Figure 3A:
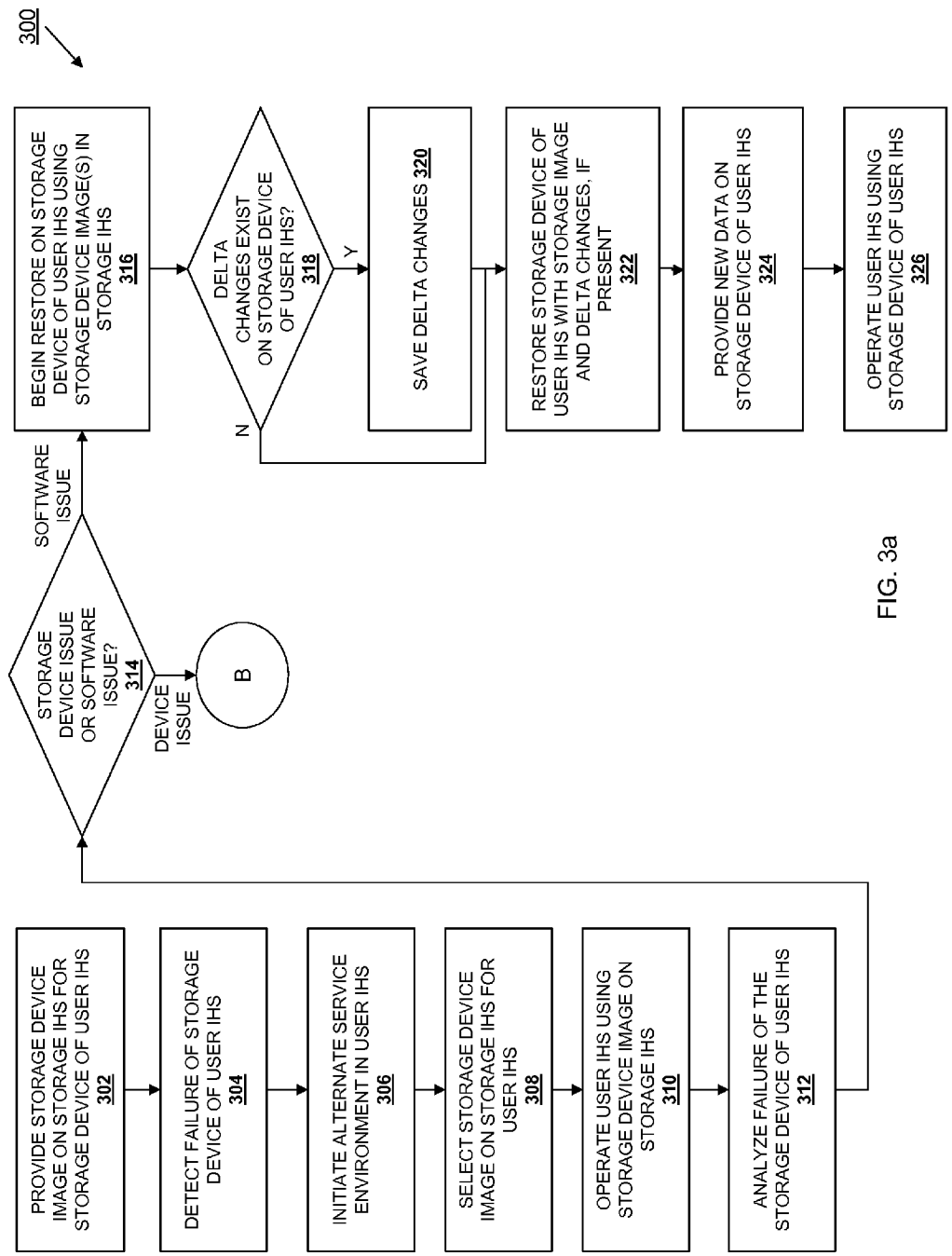
FIG. 3a is a flow chart illustrating an embodiment of a portion of a method for recovering from a storage device failure.
Figure 3B:
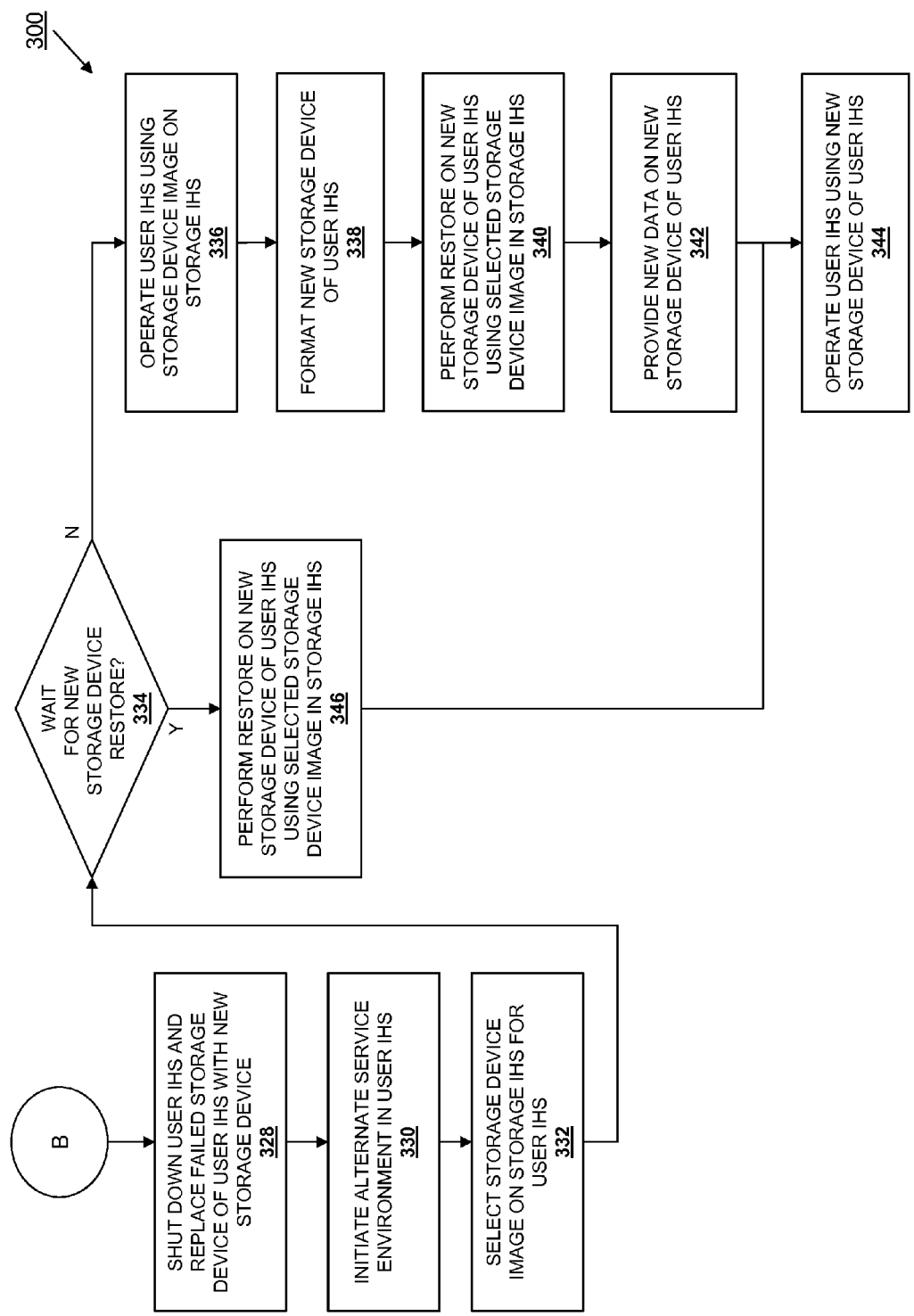
FIG. 3b is a flow chart illustrating an embodiment of a portion of a method for recovering from a storage device failure.

Referring now to FIGS. 2, 3a, and 3b, an embodiment of a method 300 for recovering from a storage device failure is illustrated. Referring first to FIG. 3a, the method 300 begins at block 302 where a storage device image for a storage device on a user IHS is provided on the storage IHS. In an embodiment, the storage repair function 202a in the user IHS 202 (e.g., as provided by the operating system or other application running on the user IHS 202) retrieves data from at least one storage device in the storage system 202c and provides that data over the network 212 to the storage device image provisioning engine 210a in the storage IHS 210. The storage device image provisioning engine 210a then stores the data received from the storage repair function 202a in the storage system 210d as a storage device image that is one of the storage device images 214 associated with the at least one storage device in the storage system 202c of the user IHS 202.

For example, the at least one storage device in the storage system 202c of the user IHS 202 may be a hard disk drive, and the data retrieved by the storage repair function 202a from that hard disk drive and provided to the storage device image provisioning engine 210a at block 302 may be a disk image that, in an embodiment, includes a file or files containing the complete contents and structure representing the hard disk drive. The disk image may be created by making a sector-by-sector copy of the hard disk drive to replicate the structure and contents of the hard disk drive, and in some embodiments unused file space may be omitted, the disk image may be compressed (typically referred to as an archive file), de-duplication operations may be performed on disk image data between disk images to save space on the storage system 210d, and/or a variety of other disk image actions may be performed on the disk image(s) stored in the storage system 210d. As discussed above, while a hard disk drive storage device is described in this embodiment, the user IHS 202 may include other types of storage devices (e.g., solid state drives and other storage devices known in the art) for which storage device images may be stored in the storage system 210d.

Furthermore, block 302 of the method 300 may involve the storage repair function 202a periodically providing data from the at least one storage device in the storage system 202c of the user IHS 202 to the storage device image provisioning engine 210a in the storage IHS 210 for storage as the storage device images 214. This periodic provision of data at block 302 may be automated (e.g., performed by the storage repair function 202a (e.g., an agent included in the operating system) at regularly scheduled times) and/or manual (e.g., in response to instructions from a user of the user IHS 202), and may result in a plurality of different storage device images 214 that are each associated with respective data states of the at least one storage device in the storage system 202c of the user IHS 202 at different times. For example, a first of the plurality of storage device images 214 may be associated with a first data state of a storage device in the storage system 202c at a first time, a second of the plurality of storage device images 214 may be associated with a second data state of that storage device in the storage system 202c at a second time that is subsequent to the first time such that the second data state is different from the first data state, and so on. Thus, in embodiments where the at least one storage device in the storage system 202c of the user IHS is a hard disk drive, the disk images 214 in the storage system 210d of the storage IHS 210 may each include a respective file that contains the complete contents and structure representing the hard disk drive at different times. In an embodiment, the storage device image provisioning engine 210a may organize the plurality of storage device images 214 by the time and date that they were provided by the storage repair function 202a. As such, in some embodiments, the storage IHS 210 may be considered a "continuous storage device image store" that is continually updated with incremental changes to the storage device(s) on each of the user IHSs 202-208 over the network 212 and organizes the storage device images associated with those incremental changes in a versioned manner.

The method 300 then proceeds to block 304 where a failure is detected in a storage device of the user IHS. At block 304, a storage device in the storage system 202c of the user IHS 202 may fail due to, for example, a failed hardware component in the storage device, a software corruption on the storage device, a malware corruption on the storage device, and/or due to a variety of other storage device failure issues known in the art. In an embodiment, at block 304 the storage repair function 202a (e.g., as provided by the BIOS or UEFI running on the user IHS 202) may detect that the storage device in the storage system 202c of the user IHS 202 has failed. For example, at block 304, the user of the user IHS 202 may start up, power on, or otherwise initiate the user IHS 202 and, due to the failure of the storage device in the storage system 202c, the instructions on the failed storage device that are typically used to provide the operating system on the user IHS 202 may be inaccessible. In such an example, the storage repair function 202a may detect that the storage device in the storage system 202c has failed due to the inaccessibility of those instructions. In another example, at block 304, the user of the user IHS 202 may be operating the user IHS 202 and, due to the failure of the storage device in the storage system 202c, the operating system or other application on the user IHS 202 may fail (e.g., "crash"). In such an example, the storage repair function 202a may detect that the storage device in the storage system 202c has failed due to the failure of the operating system or other application. In some embodiments where a BIOS or UEFI provides a portion of the storage repair function 202a, the BIOS or UEFI may detect that a storage device has failed. In other embodiments where a BIOS or UEFI provides a portion of the storage repair function 202a, the BIOS or UEFI may simply determine that the user IHS 202 has failed to start up, boot, or otherwise initialize, and the BIOS or UEFI may then operate to initiate an alternate service environment to determine that the storage device has failed as discussed below.

The method 300 then proceeds to block 306 where an alternate service environment in the user IHS is initiated. In an embodiment, in response to detecting the failure of the storage device at block 304, the storage repair function 202a (e.g., provided by the BIOS or UEFI running on the user IHS 202) may initiate an alternate service environment that is part of the storage repair function 202a but that may be provided by, for example, instructions on a persistent, non-transitory memory in the user IHS 200. In an embodiment, the provision of the alternate service environment allows the storage repair function 202a in the user IHS 202 to operate without the storage device in the storage system 202c (e.g., without access to any instructions included on the failed storage device) such that an operating system may be provided on the user IHS 202 using a storage device image retrieved over the network 212 (e.g., by retrieving instructions included in a storage device image stored on the storage IHS 210), discussed in further detail below. As such, the alternate service environment provides for the provision of an operating system on of the user IHS 202, discussed below, without the use of the failed storage device in the storage system 202c. In addition the alternate service environment may operate to communicate to the storage device image provisioning engine 210a that a storage device failure has occurred.

The method 300 then proceeds to block 308 where a storage device image that is located on the storage IHS is selected for the user IHS. In an embodiment, the storage repair function 202a selects (e.g., using the alternate service environment) a storage device image from the storage device images 214 on the storage IHS that are associated with the storage device in the storage system 202c that failed. As discussed below, the selection of the storage device image that is located on the storage IHS 210 for the user IHS 202 may include input from the user of the user IHS 202, or may be performed automatically by the storage repair function 202a.

Figure 4:
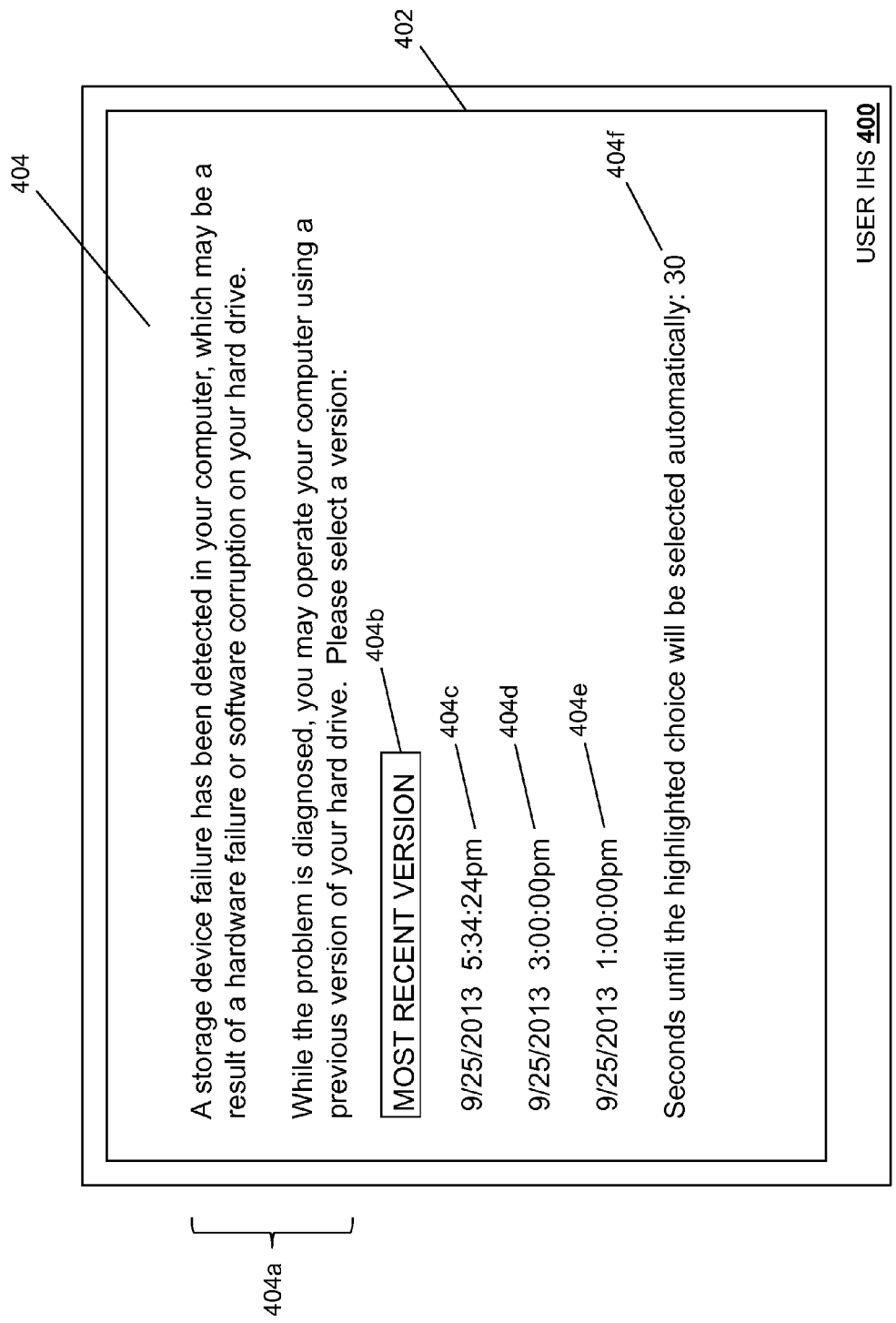
FIG. 4 is a screen shot illustrating an embodiment of a user IHS displaying a storage device image selection screen.

Referring to FIG. 4, an embodiment of a user device 400, which may be the user device 202 discussed above, is illustrated that includes a display 402 displaying a storage device image selection screen 404 that is provided by the storage repair function 202a (e.g., using the alternate service environment) following the detection of the failure of the storage device at block 304. The storage device image selection screen 404 includes a storage device failure information section 404a that informs the user of the user IHS 400 that the storage device on the user IHS 400 has been detected as failing and, while the problem is diagnosed, they may continue to operate the user IHS using a previous version of the storage device that they may select. The storage device image selection screen 404 also includes a plurality of previous versions 404b, 404c, 404d, and 404e of the storage device to select from that correspond to the storage device images 214 that are associated with the user IHS 202/400 in the storage IHS 210. As such, at block 308, the storage repair function 202a may have retrieved the previous versions 404b, 404c, 404d, and 404e of the storage device from the storage IHS 210 for display on the storage device image selection screen 404. The storage device image selection screen 404 also includes a timer 404f that indicates to the user a time after which a highlighted version of the storage device (e.g., version 404b of the storage device in the illustrated embodiment) will be selected automatically for operating the user IHS 400. While an embodiment is illustrated that allows the user to select a storage device image with which to operate the user IHS 400, in other embodiments of block 308, the storage repair function 202a may automatically select a storage device image from the storage device images 214 (e.g., the most recent version of the storage device) in response to detecting the failure of that storage device in the storage system 202c. As such, a failure of the storage device in the storage system 202c may be quickly detected and a storage device image selected such that the user IHS 202 may be operated, discussed in further detail below, with little or no intervention from the user of the user IHS 202.

The method 300 then proceeds to block 310 where the user IHS is operated using a storage device image on the storage IHS. In an embodiment, the storage repair function 202a (e.g., using the alternate service environment) communicates over the network 212 with the storage device image provisioning engine 210a in the storage IHS 210 to access the storage device image in the storage device images 214 that was selected at block 308. In response to accessing the storage device image in the storage device images 214 that was selected at block 308, the storage repair function 202a may use that storage device image to operate the user IHS 202. In an embodiment, the storage repair function 202a may use the storage device image on the storage IHS 210 to provide an operating system on the user IHS 202. However, the storage device image on the storage IHS 210 may be used by the storage repair function 202a to provide any variety of other applications, files, or functionality on the user IHS 202. In addition, in response to the alternate service environment communicating to the storage device image provisioning engine 210a that a storage device failure has occurred, the storage device image provisioning engine 210a may operate to retrieve repair software from the repair database 210e and provide that repair software to the user IHS 202 for analyzing and repairing the failed storage device, discussed below.

In one embodiment, the use of the storage device image on the storage IHS 210 to operate the user IHS 202 may involve a native desktop streaming system such as, for example, an On Demand Desktop Streaming (ODDS) system available from Citrix Systems of Fort Lauderdale, Fla., a Wyse Streaming Manager (WSM) system available from Dell, Inc. of Round Rock, Tex., and/or a variety of other native desktop streaming systems known in the art. For example, the storage repair function 202a may stream, over the network 212, instructions or other data from the storage device image in the storage devices images 214 in the storage IHS 210 and, using the at least one processor in the user IHS 202, execute those instructions or other data to provide the operating system, other applications, files, or other functionality of the user IHS 202. In an embodiment, the storage device image provisioning engine 210a may format the data associated with the storage device image that is streamed to the user IHS 202 such that the at least one processor that is local to the user IHS 202 may process that data to provide for the operation of the user IHS. In an embodiment, the storage device image provisioning engine 210a may provide the repair software as part of the data stream providing the storage device image.

In a specific embodiment of block 310, the storage repair function 202a may communicate over the network 212 with the storage device image provisioning engine 210a to send a boot image request and, in response, perform a network boot of the user IHS 202 using the storage device image in the storage IHS 210. In some embodiment, following the network boot, the storage repair function 202a may be provided by the operating system now running on the user IHS 202 based on the instructions included in the storage device image on the storage IHS 210, while in other embodiments, the storage repair function 202a may continue to be provided using the alternate service environment. As such, in some embodiments, the network boot may involve downloading a portion of the storage repair function 202a (e.g., the repair software, etc.) that is used to perform the method 300. In response to completing the network boot, the storage device image in the storage device images 214 on the storage system 210d in the storage IHS 210 may be designated by the storage repair function 202a as the primary storage device for the user IHS 202 (e.g., typically the "C:" drive in conventional systems), and may be accessed over the network during the operation of the user IHS 202 for any instructions or other data needed. As such, the user of the user IHS 202 may operate the user IHS 202 without use of the failed storage device in the storage system 202c. Furthermore, in embodiments where the storage device image selected at block 308 was provided at block 302 to the storage IHS 210 relatively recently (or if there have been no significant changes to the storage device that failed subsequent to the most recent provision of the storage device image to the storage IHS 210), the operation of the user IHS 202 using the storage device image at block 310 will appear to the user as being no different than the operation of the user IHS 202 had the storage device not failed. Thus, the user of the user IHS 202 may perform any actions or functions on the user IHS 202 at block 310 that the user could have performed had the storage device not failed.

The method 300 then proceeds to block 312 where the failure of the storage device in the user IHS is analyzed. In an embodiment, while the user is operating the user IHS 202 according to block 310, the storage repair function 202a (e.g., the repair software provided from the repair database 210e) analyzes the failure of the storage device in the storage system 202c. For example, at block 312, the storage repair function 202a may operate to designate the failed storage device as a secondary storage device for the user IHS 202 (e.g., relative to the network drive designated as the primary/"C:" drive as discussed above and including a designation such as, for example, "H:" drive), and then scan the failed storage device for storage device failure issues. However, in other examples, the storage repair function 202a may perform a variety of other failure analysis procedures known in the art to analyze the failure of the failed storage device while remaining within the scope of the present disclosure.

The method 300 then proceeds to decision block 314 where it is determined whether the failure of the storage device is a storage device issue or a software issue. In an embodiment, while the user is operating the user IHS 202 according to block 310, the storage repair function 202a uses the results of the analysis performed at block 312 to determine whether the failure of the storage device in the storage system 202c is due to a storage device issue such as failed hardware in the storage device that may be remedied by a storage system hardware failure recovery procedure, or due to a software issue such a software corruption or malware corruption of the data on the storage device that may be remedied by a storage system hardware failure recovery procedure. For example, in embodiments where the failure of the storage device is analyzed by scanning the storage device for storage device issues, such scanning may result in the determination of failed hardware in the storage device. In such an example, the determination of failed hardware in the storage device based on the scanning will result in the determination at decision block 314 that the failure of the storage device is a storage device issue, while the determination of no failed hardware in the storage device based on the scanning will result in the determination at decision block 314 that the failure of the storage device is a software issue. However, as discussed above, a variety of failure analysis techniques may be used to analyze the failure of the storage device, and thus the determination at decision block 314 may be made based on the results of any of those failure analysis techniques while remaining within the scope of the present disclosure.

If, at decision block 314, it is determined that the failure of the storage device is a software issue, the storage repair function 202a begins a storage system software failure recovery procedure, an embodiment of which is detailed below with reference to method blocks 316, 318, 320, 322, 324, and/or 326. Thus, in one embodiment, the method 300 proceeds to block 316 where a restore operation is begun on the storage device of the user IHS using the storage device image(s) in the storage IHS. In an embodiment, while the user is operating the user IHS 202 according to block 310, the storage repair function 202a begins a restore operation on the storage device in the storage system 202c of the user IHS 202 using one or more of the storage device images 214 in the storage system 210d of the storage IHS 210. For example, as discussed below, the storage repair function 202a may begin an incremental restore operation on the storage device in the storage system 202c of the user IHS 202 using one or more of the storage device images 214 in the storage IHS 210. As such, the storage repair function 202a may operate to determine one or more corrupted portions of the failed storage device, and then use the one or more storage device images 214 to restore those corrupted portions. In another example, the storage repair function 202a may begin a full restore operation on the failed storage device in the storage system 202c of the user IHS 202 using the storage device image on the storage IHS 210 that was selected at block 308 in order to restore the storage device in the storage system 202c to the data state reflected by the storage device image selected at block 308. While a few examples of the restoring of the storage device in the storage system 202c of the user IHS 202 have been provided, any of a variety of restoring operations known in the art may be performed on that storage device while remaining within the scope of the present disclosure.

The method 300 then proceeds to decision block 318 where it is determined whether delta changes on the storage device of the user IHS exist. In an embodiment, while the user is operating the user IHS 202 according to block 310, the storage repair function 202a may determine whether the failed storage device in the storage system 202c of the user IHS 202 includes delta changes relative to the storage device image(s) 214. For example, the storage repair function 202a may compare the data on the failed storage device in the storage system 202c of the user IHS 202 to the data included in the storage device image(s) that are being used to restore the failed storage device at block 316, and determine whether any differences/delta changes exist. In an embodiment, delta changes on the failed storage device in the storage system 202c of the user IHS 202 may exist in response to changes being made on that storage device subsequent to the most recent storage device image provision (as described above in block 302) such that those changes have not been provided as part of one of the storage device images 214 associated with that storage device (e.g., those changes have not been "synced" to the network storage device).

If, at decision block 318, it is determined that delta changes on the storage device exist, the method 300 then proceeds to block 320 where the delta changes on the failed storage device of the user IHS 202 are saved. In an embodiment, while the user is operating the user IHS 202 according to block 310, the storage repair function 202a may save the delta changes determined to exist at decision block 318 on the failed storage device in the storage system 202c of the user IHS 202. Following the saving of the delta changes on the failed storage device in the storage system 202c of the user IHS 202 at block 320, the method 300 then proceeds to block 322, discussed in further detail below.

If, at decision block 318, it is determined that delta changes on the storage device do not exist, or following block 320, the method 300 then proceeds to block 322 where the failed storage device on the user IHS is restored using the storage image and, if present, delta changes. In an embodiment, the data on the storage device of the user IHS 202 is compared with the storage device image and delta changes, if present, and any of the data on the failed storage device that differs from the storage device image and delta changes is replaced with the updated and/or non-corrupted data from the storage device image and delta changes. In an embodiment, while the user is operating the user IHS 202 according to block 310, the storage repair function 202a compares data in the storage device in the storage system 202c of the user IHS 202 with corresponding data in the storage device image selected at block 308, and replaces the data in the storage device that is different from the corresponding data in the storage device image. For example, the storage repair function 202a may compare each block or file of the storage device in the storage system 202c of the user IHS 202 for integrity with the storage device image selected at block 308 and replace any blocks or files that differ from blocks or files included in the storage device image. In an embodiment, the comparing of data in the storage device in the storage system 202c of the user IHS 202 with data from the storage device image in the storage IHS 210 may include performing hashing operations on that data to determine if data in the storage device is identical to data from the storage device image, such that identical data is not transferred over the network 212 and network traffic is reduced.

Following block 322, the method 300 proceeds to block 324 where new data is provided on the storage device of the user IHS. In an embodiment, the storage repair function 202a retrieves new data generated by the user IHS 202 while operating the user IHS 202 according to block 310, which may have been stored on a memory system of the IHS 202 that is separate from the failed storage device. Following the retrieval of the new data, the storage repair function 202a may quiesce (e.g., temporarily deactive or disable) the user IHS 202 and synchronize that new data to the repaired storage device of the user IHS 202. Thus, following block 324, the storage device in the storage system 202c of the user IHS 202 has been repaired and includes all of the latest changes made by the user during the repair process.

Figure 5:
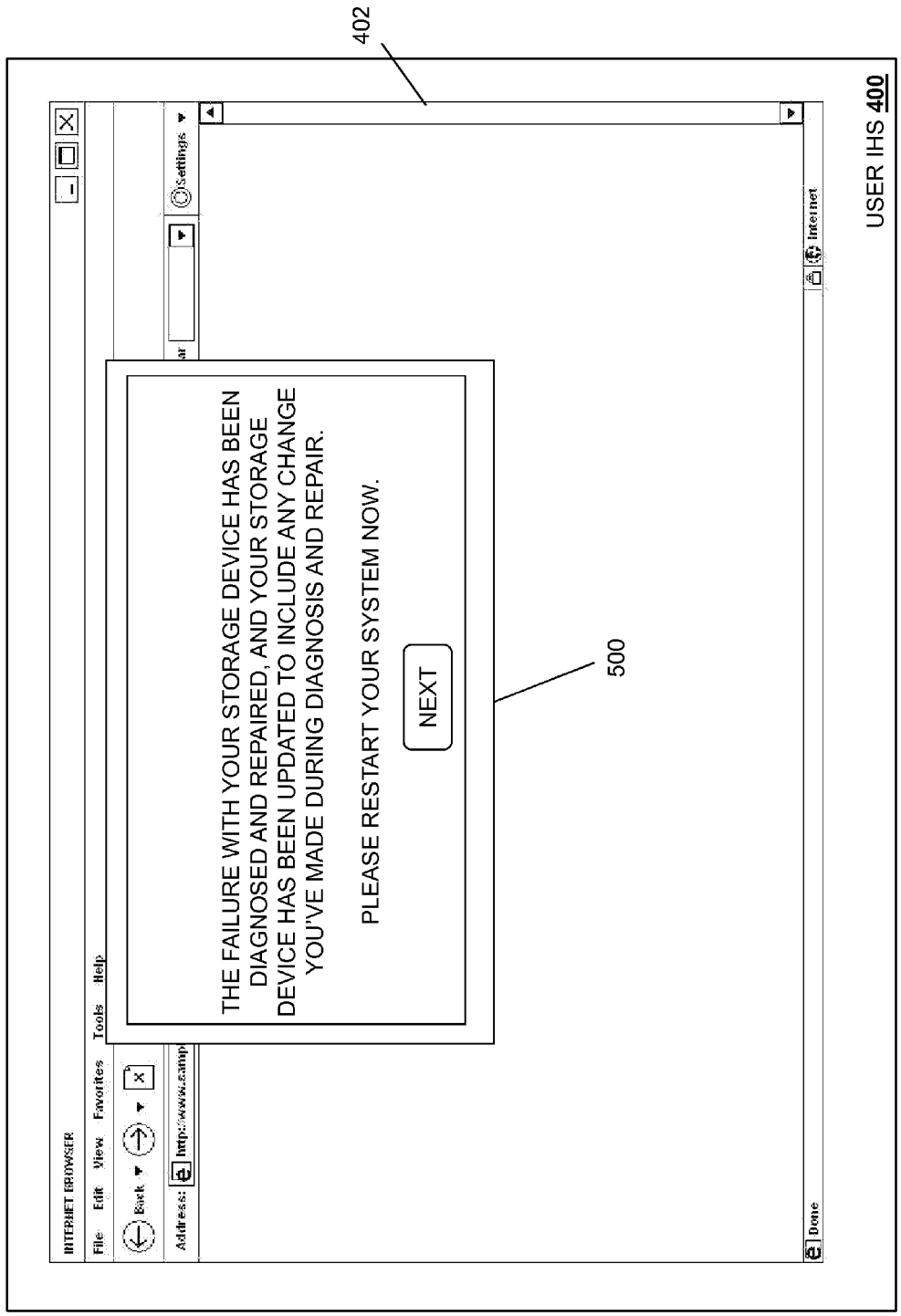
FIG. 5 is a screen shot illustrating an embodiment of a user IHS displaying a user IHS restart screen.

The method 300 then proceeds to block 326 where the user IHS is operated using the storage device of the user IHS. In an embodiment, following the repair of the storage device in the storage system 202c of the user IHS 202, the storage repair function 202a may restart the user IHS 202 such that the user IHS 202 uses the repaired storage device in the storage system 202c of the user IHS 202 to operate. For example, the storage repair function 202a may prompt the user of the user IHS 202 to restart the user IHS 202 such that the user IHS boots using the instructions or data on the repaired storage device in the storage system 202c. Referring now to FIG. 5, the user device 400 is illustrated displaying a user IHS restart screen that, in the illustrated embodiment, includes a user IHS restart request window 500 that explains to the user of the user IHS 202/400 that the failure with the storage device has been diagnosed and repaired, the storage device has been updated to include the latest changes, and requests that the user restart the user IHS 202/400. Upon restart of the user IHS 202, the user may use the user IHS 202 utilizing the storage device in the storage system 202c. Thus, in response to a storage device failure that is a result of software issues, the systems and methods of the present disclosure allow the user to remain productive by providing for the use of the user IHS 202 without that storage device in a manner that does not substantially (or does not at all) differ from the use of the user IHS with that storage device.

Figure 6:
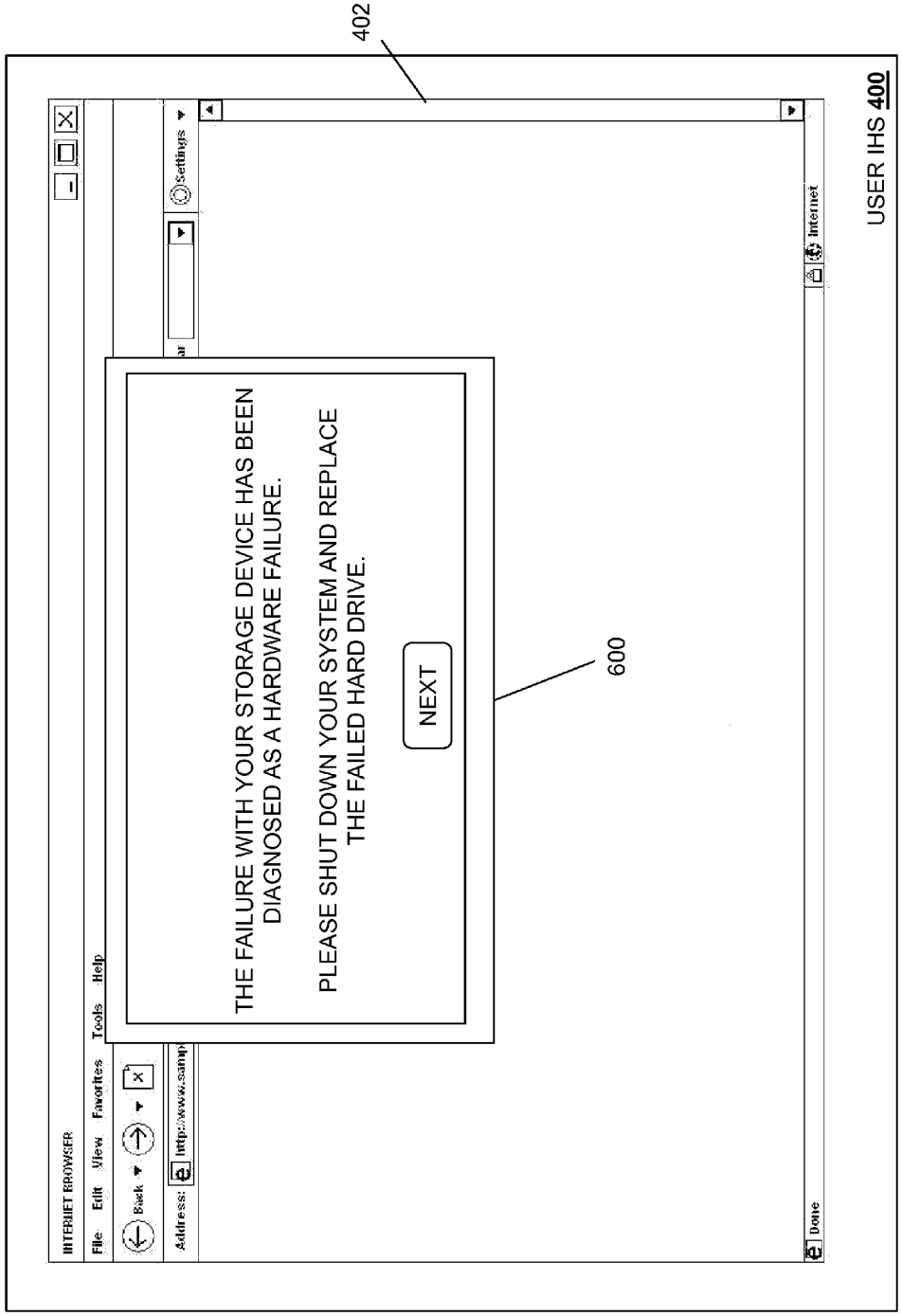
FIG. 6 is a screen shot illustrating an embodiment of a user IHS displaying a new storage device request screen.

Returning back to decision block 314, if at decision block 314 it is determined that the failure of the storage device is a storage device issue, the storage repair function 202a begins a storage system hardware failure recovery procedure, an embodiment of which is detailed below with reference to method blocks 328, 330, 332, 334, 336, 338, 340, 342, 344, and/or 346, illustrated in FIG. 3b. Thus, in one embodiment, the method 300 proceeds to block 328 where the user IHS is shut down and the failed storage device of the user IHS is replaced with a new storage device. Referring now to FIG. 6, the user device 400 is illustrated displaying a new storage device request screen that, in the illustrated embodiment, includes a user IHS new storage device request window 600 that explains to the user of the user IHS 202/400 that the failure with the storage device has been diagnosed as a hardware failure, and requests that the user shut down the user IHS 202/400 and replace the failed storage device. In response, the user or an administrator may shut down the user IHS 202, replace the failed storage device in the storage system 202c with a new storage device, and restart the user IHS 200.

The method 300 then proceeds to block 330 where an alternate service environment in the user IHS is initiated. In an embodiment, in response to the restart of the user IHS 202, the storage repair function 202a (e.g., provided by the BIOS or UEFI running on the user IHS 202 or on a persistent storage device such as, for example, embedded flash memory) may initiate an alternate service environment that is part of the storage repair function 202a but that may be provided by, for example, instructions on a persistent, non-transitory memory in the user IHS 200. Similarly as discussed above for block 306, the provision of the alternate service environment allows the storage repair function 202a in the user IHS 202 to operate without an operable storage device in the storage system 202c (e.g., with the new storage device that is not yet operable) such that an operating system may be provided on the user IHS 202 using a storage device image retrieved over the network 212 (e.g., by retrieving instructions included in a storage device image of the storage device images 214 stored on the storage system 210d of the storage IHS 210), discussed in further detail below. As such, the alternate service environment provides for the operation of the user IHS 202 with a new storage device in the storage system 202c that is not yet operable.

The method 300 then proceeds to block 332 where a storage device image on the storage IHS is selected for the user IHS. In an embodiment, the storage repair function 202a selects (e.g., using the alternate service environment) a storage device image from the storage device images 214 associated with the storage device in the storage system 202c that failed. Similarly as discussed above for block 308, the selection of the storage device image on the storage IHS 210 for the user IHS 202 may include input from the user of the user IHS 202, or may be performed automatically by the storage repair function 202a.

Figure 7:
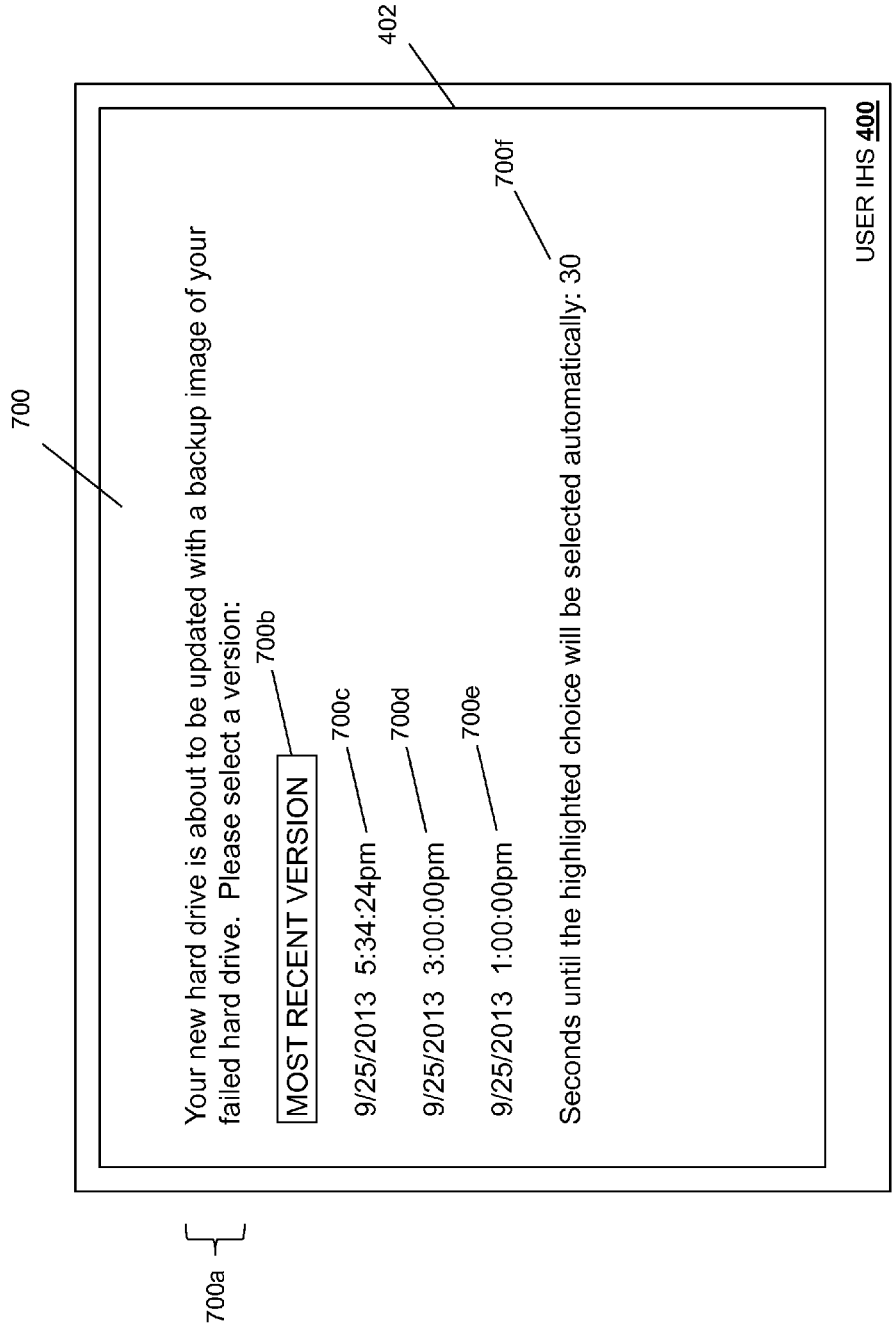
FIG. 7 is a screen shot illustrating an embodiment of a user IHS displaying a storage device image selection screen.

Referring to FIG. 7, the user device 400 is illustrated displaying a storage device image selection screen 700 that is provided by the storage repair function 202a (e.g., using the alternate service environment) following the restart of the user IHS 202. The storage device image selection screen 700 includes a new storage device update information section 700a that informs the user of the user IHS 400 that the new storage device that was provided in the user IHS 400 is about to be updated with a previous version of the failed storage device that they may select. The storage device image selection screen 700 also includes a plurality of previous versions 700b, 700c, 700d, and 700e of the storage device to select from that correspond to the stored storage device images 214 associated with the user IHS 202/400 in the storage IHS 210. As such, at block 332, the storage repair function 202a may have retrieved the previous versions 700b, 700c, 700d, and 700e the storage device from the storage IHS 210. The storage device image selection screen 700 also includes a timer 700f that indicates to the user a time after which a highlighted version of the storage device (e.g., version 700b of the storage device in the illustrated embodiment) will be selected automatically for operating the user IHS 400. While an embodiment is illustrated that allows the user to select a storage device image with which to update the new storage device (and, as described below, concurrently operate the user IHS 400), in other embodiments of block 332, the storage repair function 202a may automatically select a storage device image from the storage device images 214 (e.g., the most recent version of the storage device) in response to the new storage device being provided in the storage system 202c of the user IHS 202.

Figure 8:
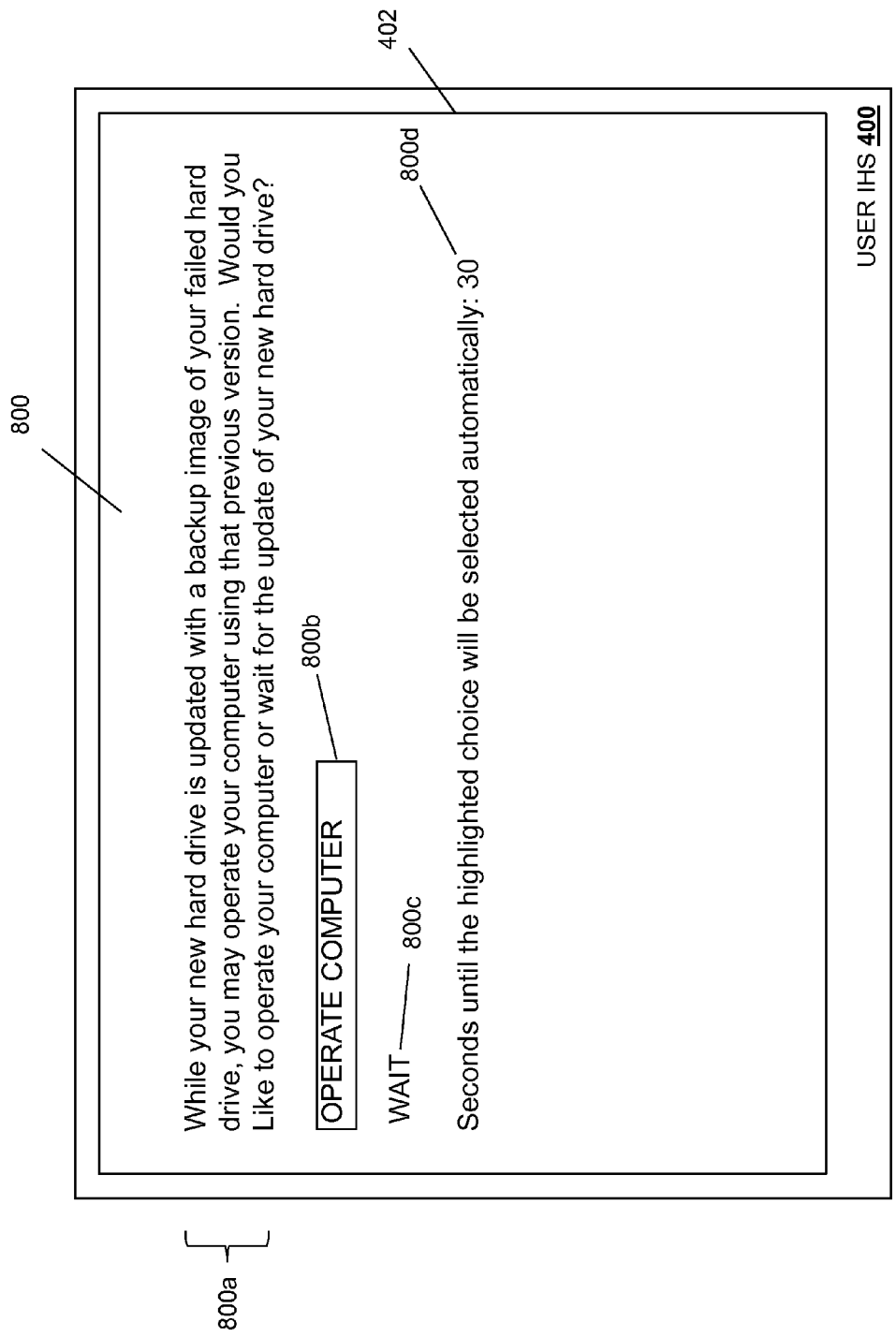
FIG. 8 is a screen shot illustrating an embodiment of a user IHS displaying a new storage device update options screen.

The method 300 then proceeds to decision block 334 where it is determined whether a user wants to wait for the new storage device to be restored. In an embodiment, the storage repair function 202a determines (e.g., using the alternate service environment) whether the user of the user IHS 202 would like to wait for the new storage device to be restored, or would like to use the user IHS 202 while the new storage device is being restored. Referring to FIG. 8, the user device 400 is illustrated displaying a new storage device update options screen 800 that may be provided by the storage repair function 202a (e.g., using the alternate service environment) following the selection of the storage device image at block 332. The new storage device update options screen 800 includes update options information section 800a that informs the user of the user IHS 400 they may operate the user IHS 400 while the new storage device is being updated with a previous version of the failed storage device, or wait to operate the user IHS 400 until the new storage device is updated, and requests that the user select one of those options. The new storage device update options screen 800 also includes an operate selector 800b and a wait selector 800c. The new storage device update options screen 800 also includes a timer 800d that indicates to the user a time after which a highlighted option (e.g., to operate the user IHS 400 in the illustrated embodiment) will be selected automatically for operating the user IHS 400. While an embodiment is illustrated that allows the user to select whether to operate the user IHS 400 while the new storage device is updated, in other embodiments of decision block 334, the storage repair function 202a may automatically select the option to operate the user IHS 202/400 while the new storage device is being updated in response to the new storage device being provided in the storage system 202c of the user IHS 202. As such, a failure of the storage device in the storage system 202c and its replacement with a new storage device may be followed with the automatic selection of a storage device image such that the new storage device may be updated and the user IHS 202 may be operated, discussed in further detail below, with little or no intervention from the user of the user IHS 202.

If, at decision block 334, it is determined that the user of the user IHS does not want to wait for the new storage device to be updated to use the user IHS, the method 300 proceeds to block 336 where the user IHS is operated using a storage device image on the storage IHS. In an embodiment, the storage repair function 202a (e.g., using the alternate service environment) communicates over the network 212 with the storage device image provisioning engine 210a in the storage IHS 210 to access the storage device image in the storage device images 214 according to the storage device image selected at block 332. In response to accessing the storage device image in the storage device images 214 according to the storage device image selected at block 332, the storage repair function 202a may use that storage device image to operate the user IHS 202. In an embodiment, the storage repair function 202a may use the storage device image in the storage device images 214 on the storage system 210d of the storage IHS 210 to provide an operating system on the user IHS 202. However, the storage device image in the storage device images 214 on the storage system 210d of the storage IHS 210 may be used by the storage repair function 202a to provide any variety of other applications, files, or functionality on the user IHS 202.

Similarly as discussed above for block 310, the use of the storage device image in the storage device images 214 on the storage system 210d of the storage IHS 210 to operate the user IHS 202 may include a native desktop streaming system such as, for example, an On Demand Desktop Streaming (ODDS) available from Citrix Systems of Fort Lauderdale, Fla., a Wyse Streaming Manager (WSM) system available from Dell, Inc. of Round Rock, Tex., and/or a variety of other native desktop streaming systems known in the art. For example, the storage repair function 202a may retrieve, over the network 212, instructions or other data from the storage device image in the storage devices images 214 in the storage IHS 210 and, using the at least one processor in the user IHS 202, execute those instructions or other data to provide the operating system, other applications, files, or other functionality of the user IHS 202.

Also similarly as discussed above for block 310, the storage repair function 202a may communicate over the network 212 with the storage device image provisioning engine 210a to send a boot image request and, in response, perform a network boot of the user IHS 202 using the storage device image in the storage IHS 210. In some embodiment, following the network boot, the storage repair function 202a may be provided by the operating system now running on the user IHS 202 based on the instructions included in the storage device image on the storage IHS 210, while in other embodiments, the storage repair function 202a may continue to be provided using the alternate service environment (e.g., using virtualization techniques known in the art). In response to completing the network boot, the storage device image in the storage device images 214 on the storage system 210d in the storage IHS 210 may be designated by the storage repair function 202a as the primary storage device for the user IHS (e.g., typically the "C:" drive in conventional systems), and may be accessed over the network during the operation of the user IHS 202 for any instructions or other data needed. As such, the user of the user IHS 202 may operate the user IHS 202 without an operational storage device in the storage system 202c. Furthermore, in embodiments where the storage device image selected at block 332 was provided at block 302 to the storage IHS 210 relatively recently (or if there were no significant changes to the storage device that failed subsequent to the most recent provision of the storage device image to the storage IHS 210), the operation of the user IHS 202 using the storage device image at block 336 will appear to the user as being no different than the operation of the user IHS 202 had the storage device not failed. Thus, the user of the user IHS 202 may perform any actions or functions on the user IHS 202 at block 310 that the user could have performed had the storage device not failed.

The method 300 then proceeds to block 338 where the new storage device is formatted. In an embodiment, while the user is operating the user IHS 202 according to block 336, the storage repair function 202a operates to format the new storage device that was provided in the user IHS 202 at block 328. For example, the storage repair function 202a may operate to prepare the new storage device for initial use by creating one or more new file systems, partitioning the new storage device, generating a new file system, and/or performing a variety of other formatting operations known in the art that prepare the new storage device for storing files.

The method 300 then proceeds to block 340 where a restore is performed on the new storage device of the user IHS using the storage device image(s) in the storage IHS. In an embodiment, while the user is operating the user IHS 202 according to block 336, the storage repair function 202a performs a restore operation on the new storage device in the storage system 202c of the user IHS 202 using one or more of the storage device images 214 in the storage system 210d of the storage IHS 210. For example, the storage repair function 202a may perform a full restore operation on the new storage device in the storage system 202c of the user IHS 202 using the storage device image that was selected at block 332 in order to restore the storage device in the storage system 202c to the data state reflected by the storage device image selected at block 332. While an example of the restoring of the new storage device in the storage system 202c of the user IHS 202 has been provided, any of a variety of restoring operations known in the art may be performed on that storage device while remaining within the scope of the present disclosure.

Figure 9:
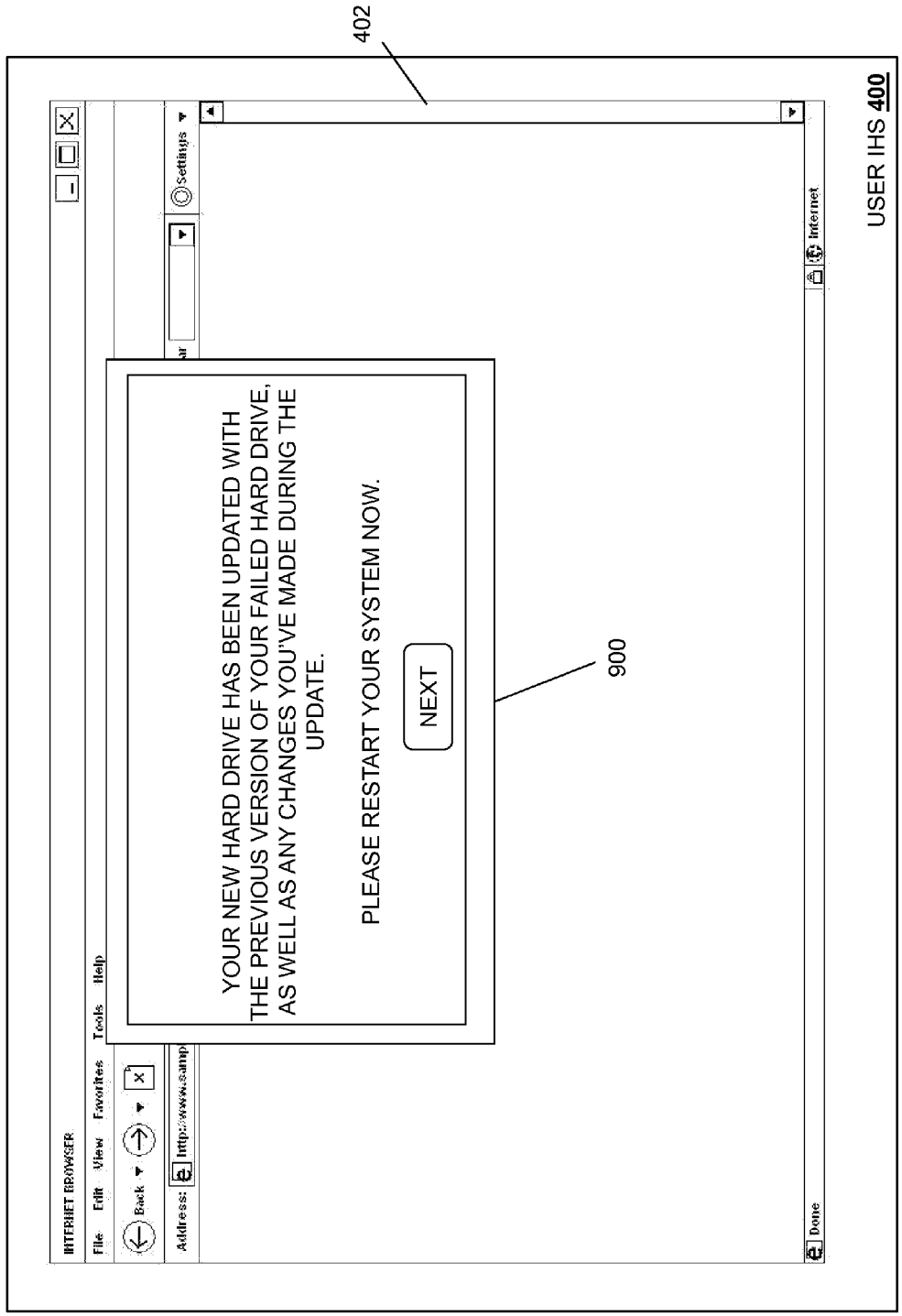
FIG. 9 is a screen shot illustrating an embodiment of a user IHS displaying a user IHS restart screen.

The method 300 then proceeds to block 342 where new data is provided on the storage device of the user IHS. In an embodiment, the storage repair function 202a retrieves new data generated by the user IHS 202 while operating the user IHS 202 according to block 336, which may have been stored on a memory system of the IHS 202 that is separate from the new storage device. Following the retrieval of the new data, the storage repair function 202a may quiesce (e.g., temporarily deactive or disable) the user IHS 202 and synchronize that new data to the new storage device of the user IHS 202. Thus, following block 324, the new storage device in the storage system 202c of the user IHS 202 has been repaired and includes all of the latest changes made by the user during the repair process The method 300 then proceeds to block 344 where the user IHS is operated using the new storage device of the user IHS. In an embodiment, following the updating of the new storage device in the storage system 202c of the user IHS 202, the storage repair function 202a may operate to restart the user IHS 202 such that the user IHS 202 uses the updated new storage device in the storage system 202c to operate. For example, the storage repair function 202a may prompt the user of the user IHS 202 to restart the user IHS 202 such that the user IHS boots using the instruction or data on the updated new storage device in the storage system 202c. Referring now to FIG. 9, the user device 400 is illustrated displaying a user IHS restart screen that, in the illustrated embodiment, includes a user IHS restart request window 900 that explains to the user of the user IHS 202/400 that the new storage device has been updated with the storage device image as well as any of the latest changes made during the update process, and requests that the user restart the user IHS 202/400. Upon restart of the user IHS 202, the user may use the user IHS 202 utilizing the new storage device in the storage system 202c. Thus, in response to a storage device failure that is a result of hardware issues, the systems and methods of the present disclosure allow the user to remain productive by having the user provide a new storage device and then providing for the use of the user IHS 202 while that new storage device is restored and updated in a manner that does not substantially (or does not at all) differ from the use of the user IHS with that storage device.

Thus, systems and methods have been described that provide for the continuous updating of storage device images for a storage device on a user IHS such that, in the event of a storage device failure, the user may operate their user IHS with little to no interruption or difference in functionality while that storage device failure is remedied. In the event of a storage device failure due to software issues, that failure may be automatically detected and the software issues repaired while the user operates the user IHS in their usual manner through native desktop streaming of the storage device image over a network. Following the repair of the software issue, the user may then simply restart their user IHS so that it operates using the repaired storage device local to the user IHS. In the event of a storage device failure due to hardware issues, that failure may be automatically detected and the user may be requested to provide a new storage device. Prior to or during the preparation of that new storage device, the user may operate the user IHS in their usual manner through native desktop streaming of the storage device image over a network. Following the preparation of that new storage device, the user may then simply restart their user IHS so that it operates using the updated new storage device local to the user IHS. As such, a user of a user IHS may operate that user IHS using a streamed storage device image when the storage device in that user IHS has failed, and may continue to operate the user IHS using that streamed storage device image until the failed storage device has been repaired or replaced and updated.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A storage device failure recovery system, comprising:
a network;
a storage information handling system (IHS), that is coupled to the network; and
a user IHS that is coupled to the network and that includes an IHS chassis that houses a storage system having a storage device, wherein the IHS chassis also houses a processing system and a memory system that includes instructions that, when executed by the processing system, cause the processing system to provide a storage repair function that is configured to:
provide a storage device image over the network to the storage IHS using data from the storage device;
detect a failure of the storage device;
retrieve at least some of the data from the storage device image through the network from the storage IHS and use the data retrieved from the storage device image to provide an operating system on the user IHS;
analyze the failure of the storage device and determine a storage system failure recovery procedure while providing the operating system on the user IHS using the data retrieved from the storage device image stored on the storage IHS; and
perform at least a portion of the storage system failure recovery procedure while providing the operating system on the user IHS using the data retrieved from the storage device image stored on the storage IHS, wherein the failure recovery procedure includes restoring the storage system using the data retrieved from the storage device image stored on the storage IHS.

2. The storage device failure recovery system of claim 1, wherein providing the storage device image over the network to the storage IHS using the data from the storage device includes periodically providing the data from the storage device over the network to the storage IHS such that the storage IHS stores a plurality of different storage device images and each of the plurality of different storage device images is associated with a respective data state of the storage device at a different time, and wherein the storage repair function is further configured to:
select a first storage device image from the plurality of different storage device images stored on the storage IHS for use in providing the operating system on the user IHS while analyzing the failure of the storage device and performing at least a portion of the storage system failure recovery procedure.

3. The storage device failure recovery system of claim 1, wherein the storage repair function is further configured to:
provide an alternate service environment on the user IHS in response to detecting the failure of the storage device, wherein the alternate service environment allows the provision of the operating system on the user IHS using the data retrieved from the storage device image stored on the storage IHS while the failure of the storage device prevents the storage device from being used to provide an operating system.

4. The storage device failure recovery system of claim 1, wherein the storage repair function is further configured to:
store new data that is generated on the user IHS while the operating system is provided on the user IHS using the data retrieved from the storage device image stored on the storage IHS; and
provide the new data on the storage system that was restored using the data retrieved from the storage device image stored on the storage IHS.

5. The storage device failure recovery system of claim 1, wherein the determining the storage system failure recovery procedure includes determining a storage system software failure recovery procedure, and wherein the performing at least a portion of the storage system failure recovery procedure includes performing the storage system software failure recovery procedure that includes replacing any data of the storage device that is different from corresponding data in the storage device image.

6. The storage device failure recovery system of claim 1, wherein the determining the storage system failure recovery procedure includes determining a storage system hardware failure recovery procedure, and wherein the performing at least a portion of the storage system failure recovery procedure includes performing the storage system hardware failure recovery procedure that includes requesting a storage device replacement.

7. The storage device failure recovery system of claim 6, wherein the performing the storage system hardware failure recovery procedure includes detecting a new storage device and, while providing the operating system on the user IHS using the data retrieved from the storage device image stored on the storage IHS, formatting the new storage device and restoring the new storage device using the data retrieved from storage device image stored on the storage IHS.

8. An information handling system (IHS), comprising:
a chassis;
a storage system included in the chassis;
a communications coupling included in the chassis;
at least one processor included in the chassis and coupled to the storage system and the communications coupling; and
at least one non-transitory memory system included in the chassis and storing instructions that, when executed by the at least one processor, cause the at least one processor to provide a storage repair function that is configured to:
provide a storage device image over the communications coupling to a storage IHS using data retrieved from a storage device included in the storage system;
detect a failure of the storage device;
retrieve at least some of the data from the storage device image through the communications coupling from the storage IHS and use the data retrieved from the storage device image to provide an operating system;
analyze the failure of the storage device and determine a storage system failure recovery procedure while providing the operating system using the data retrieved from storage device image stored on the storage IHS; and
perform at least a portion of the storage system failure recovery procedure while providing the operating system using the data retrieved from storage device image stored on the storage IHS, wherein the failure recovery procedure includes restoring the storage system using the data retrieved from storage device image stored on the storage IHS.

9. The IHS of claim 8, wherein the providing the storage device image over the communications coupling to the storage IHS using the data from the storage device includes periodically providing the data from the storage device over the communications coupling to the storage IHS such that the storage IHS stores a plurality of different storage device images and each of the plurality of different storage device images is associated with a respective data state of the storage device at a different time, and wherein the storage repair function is further configured to:

select a first storage device image from the plurality of different storage device images stored on the storage IHS for use in providing the operating system while analyzing the failure of the storage device and performing at least a portion of the storage system failure recovery procedure.

10. The IHS of claim 8, wherein the storage repair function is further configured to:

provide an alternate service environment in response to detecting the failure of the storage device, wherein the alternate service environment allows the provision of the operating system using the data retrieved from storage device image stored on the storage IHS while the failure of the storage device prevents the storage device from being used to provide an operating system.

11. The IHS of claim 8, wherein the storage repair function is further configured to:

store new data that is generated while the operating system is provided using the data retrieved from storage device image stored on the storage IHS; and provide the new data on the storage system that was restored using the data retrieved from storage device image stored on the storage IHS.

12. The IHS of claim 8, wherein the determining the storage system failure recovery procedure includes determining a storage system software failure recovery procedure, and wherein the performing at least a portion of the storage system failure recovery procedure includes performing the storage system software failure recovery procedure that includes replacing any data of the storage device that is different from corresponding data in the storage device image.

13. The IHS of claim 8, wherein the determining the storage system failure recovery procedure includes determining a storage system hardware failure recovery procedure, and wherein the performing at least a portion of the storage system failure recovery procedure includes performing the storage system hardware failure recovery procedure that includes requesting a storage device replacement.

14. The IHS of claim 13, wherein the performing the storage system hardware failure recovery procedure includes detecting a new storage device and, while providing the operating system using the data retrieved from storage device image stored on the storage IHS, formatting the new storage device and restoring the new storage device using the data retrieved from storage device image stored on the storage IHS.

15. A method for recovering from a storage device failure, comprising:

providing, by a processing system that is housed in a chassis, a storage device image over a network to a storage information handling system (IHS) using data from a storage device that is housed in the chassis;

detecting, by the processing system, a failure of the storage device;

retrieving, by the processing system, at least some of the data from the storage device image through the network from the storage IHS and using the data retrieved from the storage device image to provide an operating system;

analyzing, by the processing system, the failure of the storage device and determining a storage system failure recovery procedure while providing the operating system using the data retrieved from the storage device image stored on the storage IHS; and performing at least a portion of the storage system failure recovery procedure while providing the operating system using the data retrieved from the storage device image stored on the storage IHS, wherein the failure recovery procedure includes restoring the storage system using the data retrieved from the storage device image stored on the storage IHS.

16. The method of claim 15, wherein the providing the storage device image over the network to the storage IHS using the data from the storage device includes periodically providing the data from the storage device over the network to the storage IHS such that the storage IHS stores a plurality of different storage device images and each of the plurality of different storage device images is associated with a respective data state of the storage device at a different time, and wherein the method further comprises:

selecting a first storage device image from the plurality of different storage device images stored on the storage IHS for use in providing the operating system while analyzing the failure of the storage device and performing at least a portion of the storage system failure recovery procedure.

17. The method of claim 15, further comprising:

providing an alternate service environment on the user IHS in response to detecting the failure of the storage device, wherein the alternate service environment allows the provision of the operating system using the data retrieved from the storage device image stored on the storage IHS while the failure of the storage device prevents the storage device from being used to provide an operating system.

18. The method of claim 15, further comprising:

storing new data that is generated while the operating system is provided using the data retrieved from the storage device image stored on the storage IHS; and providing the new data on the storage system that was restored using the data retrieved from the storage device image stored on the storage IHS.

19. The method of claim 15, wherein the determining the storage system failure recovery procedure includes determining a storage system software failure recovery procedure, and wherein the performing at least a portion of the storage system failure recovery procedure includes performing the storage system software failure recovery procedure that includes replacing any data of the storage device that is different from corresponding data in the storage device image.

20. The method of claim 15, wherein the determining the storage system failure recovery procedure includes determining a storage system hardware failure recovery procedure, and wherein the performing at least a portion of the storage system failure recovery procedure includes performing the storage system hardware failure recovery procedure that includes requesting a storage device replacement, detecting a new storage device and, while providing the operating system on the user IHS using the data retrieved from the storage device image stored on the storage IHS, formatting the new storage device and restoring the new storage device using the data retrieved from the storage device image stored on the storage IHS.

* * * * *